(12) United States Patent
Kang et al.

(10) Patent No.: US 9,298,332 B2
(45) Date of Patent: *Mar. 29, 2016

(54) TOUCH SCREEN PANEL

(71) Applicant: Samsung Display Co., Ltd., Yongin, Gyeonggi-do (KR)

(72) Inventors: Sung-Ku Kang, Yongin (KR); Tae-Hyeog Jung, Yongin (KR); Choon-Hyop Lee, Yongin (KR); Dong-Wook Kang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,711

(22) Filed: Mar. 20, 2015

(65) Prior Publication Data
US 2015/0193058 A1    Jul. 9, 2015

Related U.S. Application Data

(63) Continuation of application No. 14/179,342, filed on Feb. 12, 2014, now Pat. No. 9,001,079, which is a continuation of application No. 13/891,693, filed on May 10, 2013, now Pat. No. Re. 44,866, which is an application for the reissue of Pat. No. 8,330,740.

(30) Foreign Application Priority Data

Jan. 16, 2009    (KR) .................. 10-2009-0003631

(51) Int. Cl.
G06F 3/045    (2006.01)
G06F 3/044    (2006.01)
G06F 3/041    (2006.01)

(52) U.S. Cl.
CPC .............. *G06F 3/044* (2013.01); *G06F 3/0416* (2013.01)

(58) Field of Classification Search
CPC ......... G06F 3/041; G06F 3/042; G06F 3/044; G06F 3/0412
USPC ................................ 345/173–178, 204–212; 178/18.01–18.07, 20.01–20.04
See application file for complete search history.

(56) References Cited

U.S. PATENT DOCUMENTS 7,489,304 B2    2/2009    Nakazawa et al.
7,663,607 B2    2/2010    Hotelling et al.
(Continued)

FOREIGN PATENT DOCUMENTS

KR    1995-0001468    1/1995
KR    10-2005-0072680    7/2005
(Continued)

OTHER PUBLICATIONS

Korean Notice of Allowance dated Feb. 26, 2011 of the corresponding Korean Patent Application No. 10-2009-0003631 (2 pages).

*Primary Examiner* — Vijay Shankar
(74) *Attorney, Agent, or Firm* — Lewis Roca Rothgerber Christie LLP (57) ABSTRACT

A touch screen panel provided in an image display device. The touch screen panel includes: a transparent substrate; a plurality of first sensing patterns on the transparent substrate and coupled to each other along a first direction; a first insulating film on the first sensing patterns; a plurality of second sensing patterns on the first insulating film and coupled to each other along a second direction, the first and second sensing patterns being alternately arranged not to overlap with each other; and a second insulating film on the second sensing patterns, wherein the first insulating film and the second insulating film are composed of materials having different optical refractive indexes.

13 Claims, 5 Drawing Sheets

(56) References Cited

U.S. PATENT DOCUMENTS

| | | |
|---|---|---|
| 8,125,466 B2 | 2/2012 | Hamm et al. |
| 8,330,740 B2 | 12/2012 | Kang et al. |
| RE44,866 E | 4/2014 | Kang et al. |
| 9,001,079 B2 * | 4/2015 | Kang et al. .................. 345/174 |
| 2004/0032401 A1 | 2/2004 | Nakazawa et al. |
| 2005/0083307 A1 | 4/2005 | Aufderheide et al. |
| 2005/0156906 A1 | 7/2005 | Chiu et al. |
| 2006/0097991 A1 | 5/2006 | Hotelling et al. |
| 2008/0264699 A1 | 10/2008 | Chang et al. |
| 2008/0309635 A1 | 12/2008 | Matsuo |
| 2009/0167721 A1 | 7/2009 | Hamm et al. |
| 2010/0066700 A1 | 3/2010 | Mozdzyn |

FOREIGN PATENT DOCUMENTS

| | | |
|---|---|---|
| KR | 10-2008-0043414 | 5/2008 |
| KR | 10-2008-0110477 | 12/2008 |

* cited by examiner

TOUCH SCREEN PANEL

CROSS-REFERENCE TO RELATED APPLICATIONS

This application is a continuation of U.S. patent application Ser. No. 14/179,342, filed Feb. 12, 2014, and issued as U.S. Pat. No. 9,001,079, which is a continuation of U.S. patent application Ser. No. 13/891,693, reissued as U.S. Pat. No. RE44866, on Apr. 29, 2014, which is a reissue of U.S. Pat. No. 8,330,740, issued Dec. 11, 2012, which claims priority to and the benefit of Korean Patent Application No. 10-2009-0003631, filed Jan. 16, 2009, the entire content of each of which is incorporated herein by reference.

BACKGROUND OF THE INVENTION

1. Field of the Invention

The present invention relates to a touch screen panel provided in an image display device, etc.

2. Description of Related Art

A touch screen panel is an input device by which a user can input his or her instruction by selecting an instructed content displayed on a screen such as an image display device, etc. using a human's finger or an object.

To this end, the touch screen panel is provided on the front face of the image display device to convert a contact position in direct contact with the human's finger or object into an electrical signal. Therefore, the instructed content selected on the contact position is accepted as an input signal.

Applications of the touch screen panel are expanding widely because it can replace an input device that is coupled to and operates the image display device such as a keyboard, a mouse, or the like.

A touch screen panel can be categorized into a resistive type, a photosensitive type and an electrostatic capacitive type.

Among the types of touch screen panels, the electrostatic capacitive type touch screen panel uses a conductive sensing pattern to sense a change in electrostatic capacitance formed in association with other sensing patterns in the vicinity thereof or a ground electrode, etc., thereby converting a touch with a contact position into an electrical signal.

Here, in order to clearly determine the contact position on the contact surface, the sensing pattern includes first sensing patterns (X patterns) formed to be coupled along a first direction, and second sensing patterns (Y patterns) formed to be coupled along a second direction.

The first and second sensing patterns as described above are generally positioned in the same layer. In this case, the sensing patterns positioned on the same X or Y lines are coupled by forming separate coupling patterns through contact holes formed on insulating films on the upper portions thereof. Accordingly, additional masks may be required, and the fabrication process thereof may be complicated.

In addition, the touch screen panel is positioned on the display panel such as a liquid crystal display panel, etc., wherein light emitted from the display panel reaches a user while being transmitted through the touch screen panel. Also, an external light incident on the external surface of the touch screen panel is reflected. Therefore, in order to display a uniform image, it is desirable to prevent or reduce a difference in light reflectance from being generated from the touch screen panel.

SUMMARY OF THE INVENTION

Aspects of the embodiments of the present invention are directed toward a touch screen panel with a reduced difference in light reflectance throughout the entire panel, and/or toward simplifying a fabrication process for the touch screen panel by reducing the number of masks utilized in the fabrication process.

According to one embodiment of the present invention, there is provided a touch screen panel including: a transparent substrate; a plurality of first sensing patterns on the transparent substrate and coupled to each other along a first direction; a first insulating film on the first sensing patterns; a plurality of second sensing patterns on the first insulating film and coupled to each other along a second direction crossing the first direction, the first and second sensing patterns being alternately arranged with the first sensing patterns to not overlap with the first sensing patterns; and a second insulating film on the second sensing patterns, wherein the first insulating film and the second insulating film are composed of materials having different optical refractive indexes.

The first insulating layer may be composed of a material having an optical refractive index greater than that of the second insulating film.

Also, the first sensing patterns may be composed of ITO, and the first insulating film may be composed of a material having an optical refractive index between about 1.7 and about 1.8. The second sensing patterns may be composed of a material having an optical refractive index between about 1.5 and about 1.65.

Also, the second insulating film may be composed of a material having an optical refractive index between the optical refractive index of air and the optical refractive index of the first insulating film.

Also, the first sensing patterns may be composed of ITO, and the first insulating film may be composed of a transparent insulating material comprising between about 10 and about 30 wt % of $SiO_2$, between about 5 and about 30 wt % of $ZrO_2$, between about 1 and about 60 wt % of $TiO_2$. In one embodiment, the transparent insulating material of the first insulating film may be composed of about 30 wt % of $SiO_2$, about 10 wt % of $ZrO_2$, and about 60 wt % of $TiO_2$. The second insulating film may be composed of a transparent insulating material having a composition of about 20 wt % of $SiO_2$, about 10 wt % of $ZrO_2$, about 50 wt % of $TiO_2$, and about 20 wt % of $SiO_2$ filler.

Also, the second insulating film may have a surface roughness greater than that of the first insulating film.

With the touch screen panel as described in the above embodiments of the present invention, the first sensing patterns coupled to each other along the first direction and the second sensing patterns coupled to each other along the second direction are disposed on different layers, thereby making it feasible to reduce the number of masks and to simplify the process.

Also, the optical refractive index of the first insulating layer positioned on the first sensing patterns and the optical refractive index of the second insulating layer positioned on the second sensing patterns are controlled, thereby making it feasible to improve the difference in light reflectance that may be generated as the first and second sensing patterns are disposed in different layers.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF EXEMPLARY EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Hereinafter, exemplary embodiments according to the present invention will be described in more detail with reference to the accompanying drawings.

Figure 1:
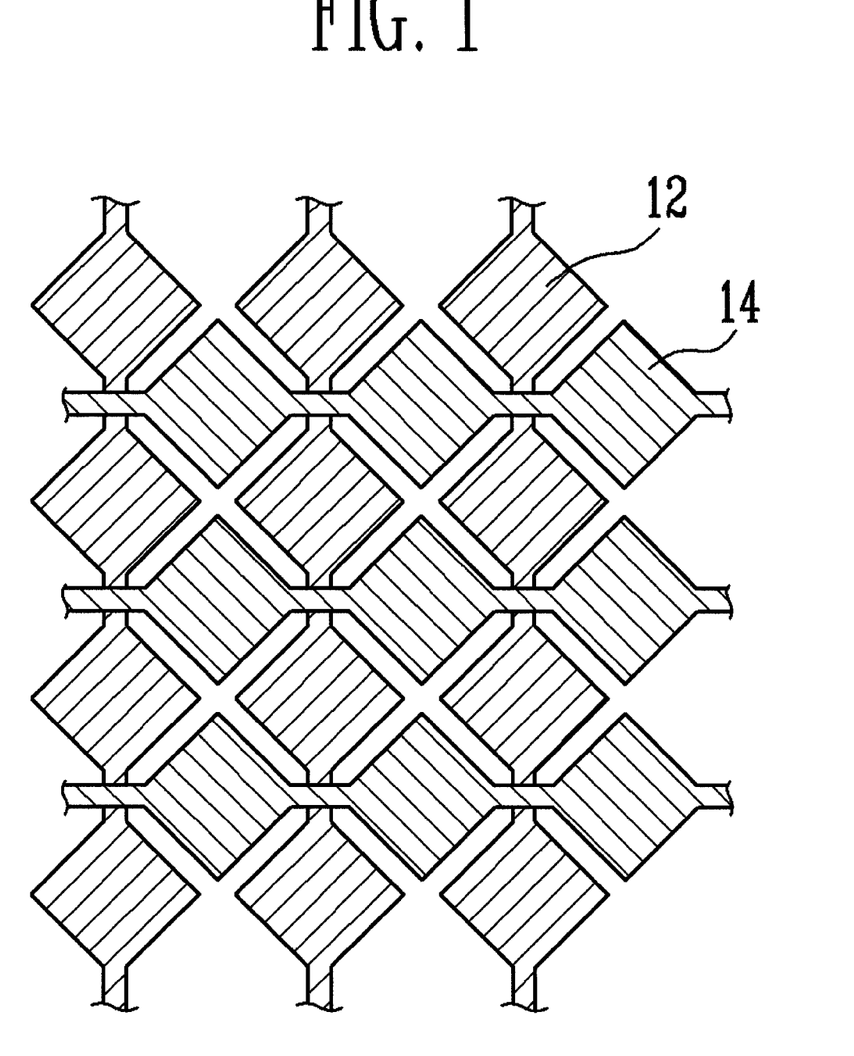
FIG. 1 is a plan schematic view showing an arrangement of sensing patterns according to an embodiment of the present invention.

FIG. 1 is a plan schematic view showing an arrangement of sensing patterns according to an embodiment of the present invention.

Referring to FIG. 1, the sensing patterns according to the embodiment of the present invention include first and second sensing patterns 12 and 14 that are alternately disposed, wherein the sensing patterns in one column unit having the same X-coordinate or the sensing patterns in one row unit having the same Y-coordinate are coupled to each other.

For example, the first sensing patterns 12 may include a plurality of X patterns, wherein the sensing patterns in one column having the same X-coordinate along a first direction (a column direction) are coupled to each other. The second sensing patterns 14 may include a plurality of Y patterns, wherein the sensing patterns in one row having the same Y-coordinate along a second direction (a row direction) are coupled to each other.

However, in the embodiment of FIG. 1, the first sensing patterns 12 and the second sensing patterns 14 are disposed in different layers, respectively. For example, the first sensing patterns 12 may be positioned in a lower layer; the second sensing patterns 14 may be positioned in an upper layer; and insulating films may be interposed therebetween.

As described above, if the first sensing patterns 12 and the second sensing patterns 14 are disposed in different layers, respectively, the first sensing patterns 12 positioned in the same column can be formed to be coupled to each other while patterning the first sensing patterns 12, and the second sensing patterns 14 positioned in the same row can be formed to be coupled to each other while patterning the second sensing patterns 14.

Therefore, a process of forming separate contact holes and coupling patterns can be omitted, thereby making it possible to reduce the number of masks and to simplify the process.

Figure 2:
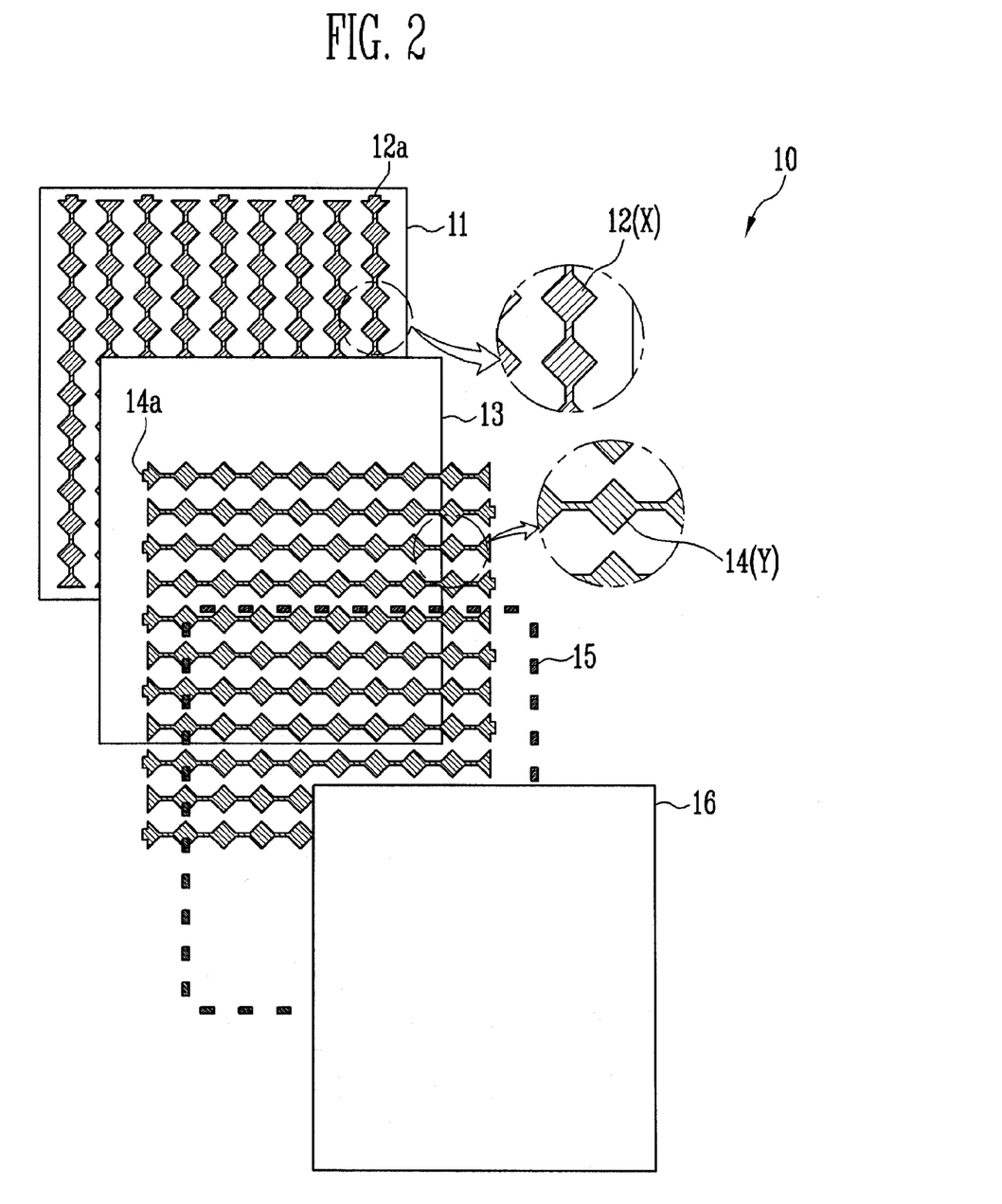
FIG. 2 is an exploded plan schematic view of a touch screen panel according an embodiment of the present invention.
Figure 3:
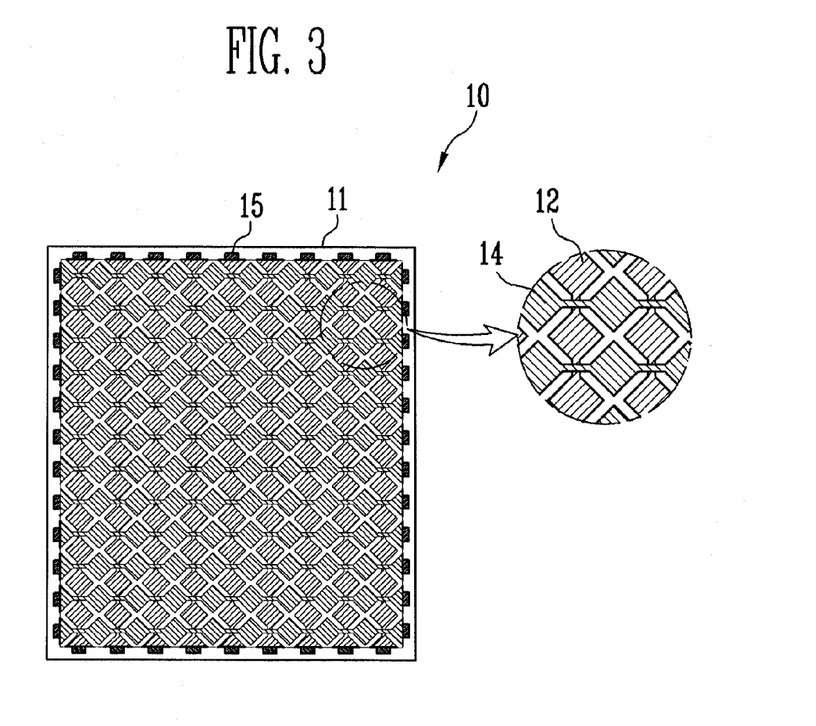
FIG. 3 is a plan schematic view of the assembled touch screen panel of FIG. 2.

FIG. 2 is an exploded plan schematic view of a touch screen panel according an embodiment of the present invention, and FIG. 3 is a plan schematic view of the assembled touch screen panel of FIG. 2.

Referring to FIGS. 2 and 3, the touch screen panel 10 according to the embodiment of the present invention includes a transparent substrate 11. In addition, the touch screen panel 10 includes first sensing patterns 12, a first insulating film 13, second sensing patterns 14, metal patterns 15 and a second insulating film 16 that are formed sequentially on the transparent substrate 11.

The first sensing patterns 12 are formed on one surface of the transparent substrate 11 to be coupled to each other along a first direction. For example, the first sensing patterns 12 may be formed on the upper surface of the transparent substrate 11 to be closed to each other, having a regular pattern such as a diamond pattern. The first sensing patterns 12 as described above may include a plurality of X patterns, wherein the first sensing patterns 12 in one column having the same X-coordinate are coupled to each other. Here, the shapes of the first sensing patterns 12 are not limited to the diamond shape patterns, but it may be implemented as various suitable shapes such that the sensing patterns can be close to each other.

The first sensing patterns 12 have pads 12a that are electrically coupled to the metal patterns 15 for each column of the first sensing patterns 12. The pads 12a of the first sensing patterns 12 may be alternately provided on the upper side or the lower side, may be positioned on the upper side or the lower side, or may be positioned on both the upper and lower sides, for each column of the first sensing patterns 12.

However, the first sensing patterns 12 are formed not to be overlapped with the second sensing patterns 14, except for the coupling portions thereof. In other words, the first sensing patterns 12 and the second sensing patterns 14 are disposed alternately to cross each other.

The first insulating film 13 is formed on the first sensing patterns 12 to cover them.

The second sensing patterns 14 are formed on the first insulating film (layer) 13 to be coupled to each other along a second direction, but are disposed alternately with the first sensing patterns 12 so as not to be overlapped with the first sensing patterns 12. For example, the second sensing patterns 14 may be formed to be closed to each other, having the same diamond pattern as the first sensing patterns 12, and may include a plurality of Y patterns, wherein the second sensing patterns 14 in one row having the same Y-coordinate are coupled to each other.

The second sensing patterns 14 have pads 14a that are electrically coupled to the metal patterns 15 for each row of the second sensing patterns 14. The pads 14a of the second sensing patterns 14 may be alternately provided on the left side or the right side, may be positioned on any one of the left side or the right side, or may be positioned on both the left and right sides, for each row of the second sensing patterns 14.

In addition, the first and second sensing patterns 12 and 14 and the first insulating film 13 are composed of a transparent material so that light emitted from a display panel, etc. disposed below the lower portion of the touch screen panel 10 can transmit through the touch screen panel 10. In one embodiment, the first and second sensing patterns 12 and 14 are composed of a transparent electrode material such as indium tin oxide (hereinafter, referred to as ITO), and the first insulating film 13 is composed of a transparent insulating material. Here, the term of transparent refers to a high light transmittance as well as being transparent by 100%.

The thicknesses of the first and second sensing patterns 12 and 14 and the first insulating film 13 can be set to be within a suitable range such that the touch screen panel 10 (in particular, the first and second sensing patterns 12 and 14) have a relatively low surface resistance, and can provide sufficient transmittance of light transmitted from the display panel. In other words, the thickness of the first and second sensing patterns 12 and 14 and the first insulating film 13 can be designed in consideration of the transmittance and the surface resistance.

In one embodiment, each of the first and second sensing patterns 12 and 14 may be formed of an indium tin oxide (ITO) pattern having a thickness between 100 and 300 Å, and the first insulating film 13 may be composed of a transparent insulating material having a thickness between 400 and 1000 Å (e.g., a thickness between 400 and 700 Å). However, this is merely one embodiment, and the present invention is not limited thereto. Therefore, the thickness thereof may also be suitably changed in consideration of the desired transmittance and/or the surface resistance, etc.

The metal patterns 15 are disposed on the edge portions of the regions where the first and second sensing patterns 12 and 14 are formed, for example, on regions corresponding to the pads 12a and 14a of the first and second sensing patterns 12 and 14. The metal patterns 15 as described above are electrically coupled to the sensing patterns 12 and 14 in row units and/or in column units to position detecting lines, respectively, to allow contact position detecting signals to be supplied to a driving circuit, etc.

The second insulating film 16 is formed on the second sensing patterns 14 to cover them. In one embodiment, the second insulating film 16 may be formed on the second sensing patterns 14, composed of a transparent insulating material having a thickness between 400 and 1000 Å.

If the assembled touch screen panel 10 as shown in FIG. 3 is touched by a human's hand or an object, a change in electrostatic capacitance in accordance with the contact position is transferred to the driving circuit via the first and second sensing patterns 12 and 14, the metal patterns 15 and the position detecting lines. The change in electrostatic capacitance is converted into an electrical signal, for example, by the X and Y input processing circuits, etc. so that the contact position is determined.

With the touch screen panel 10 as described in the above embodiments, the first sensing patterns 12 coupled to each other along the first direction and the second sensing patterns 14 coupled to each other along the second direction are disposed in different layers, thereby making it feasible to reduce the number of masks used in the fabrication process of the touch screen panel 10 and to simplify the process.

Figure 4:
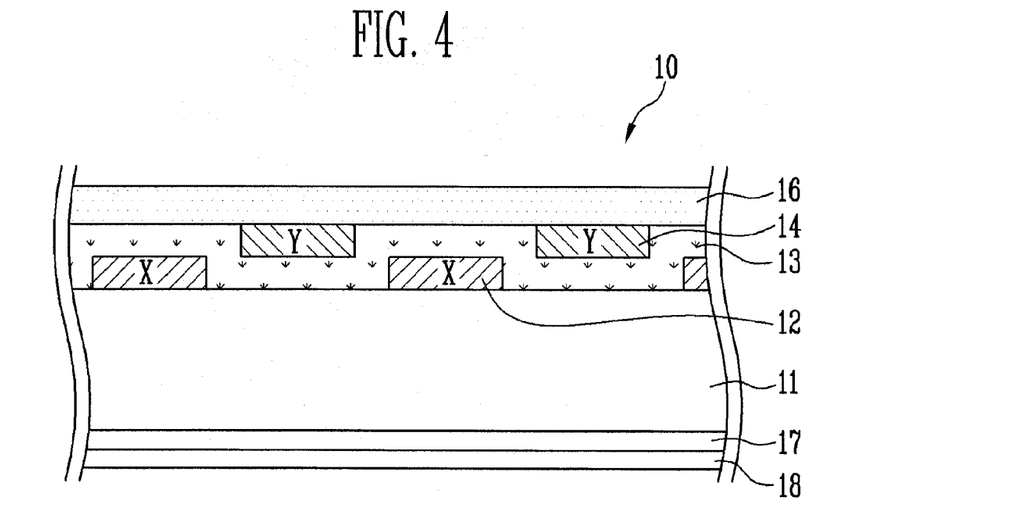
FIG. 4 is a cross-sectional schematic view of certain parts of the assembled touch screen panel of FIGS. 2.

FIG. 4 is a cross-sectional schematic view of certain parts of the assembled touch screen panel of FIG. 2. When describing FIG. 4, the same reference numerals are given to the same elements as shown in FIGS. 2 and 3, and the detailed description thereof will be omitted.

Referring to FIG. 4, the first sensing patterns 12 and the second sensing patterns 14 are interposed between the first insulating film 13 and are disposed alternately on different layers.

If the first and second sensing patterns 12 and 14 are disposed on different layers as described above, the first or second sensing patterns 12 or 14 positioned in the same row and in the same column can be coupled during a patterning step. Therefore, a process of forming contact holes for coupling the first or second sensing patterns 12 or 14 positioned in the same row and/or in the same column may be omitted.

In addition, a transparent ground electrode 17 and a third insulating film 18 that covers the transparent ground electrode 17 may be further formed on the other surface opposite to the surface of the transparent substrate 11 on which the first and second sensing patterns 12 and 14 are formed, that is, on the lower surface of the transparent substrate 11.

In one embodiment, the transparent ground electrode 17 composed of a transparent electrode material such as ITO, etc. having a thickness between 100 and 300 Å may be formed on the lower surface of the transparent substrate 11, and the third insulating film 18 that covers the transparent ground electrode 17, having a thickness between 400 and 1000 Å, may be formed on the lower surface of the transparent ground electrode 17.

However, the above described embodiment is merely one embodiment, and the thickness of the transparent ground electrode 17 and the third insulating film 18 may be suitably modified in consideration of the desired light transmittance, etc. Also, the transparent ground electrode 17 and/or the third insulating film 18 may also be omitted according to the design of a product.

The transparent ground electrode 17 may be utilized in securing stability between the touch screen panel 10 and the display panel, etc. Also, the transparent ground electrode 17 may be used together with the first and second sensing patterns 12 and 14 to form the electrostatic capacitance according to the design method of the touch screen panel 10.

For example, in the electrostatic capacitive type touch screen panel 10, in order to sense the contact position, the electrostatic capacitance between the first sensing pattern 12 and the second sensing pattern 14 may be utilized, or the electrostatic capacitance between the first and second sensing patterns 12 and 14 and the transparent ground electrode 17 may be utilized, wherein these sensing patterns may be suitably modified.

However, in some embodiments of the present invention, the first insulating film 13 and the second insulating film 16 are composed of materials having different optical refractive indexes.

In one embodiment, the first insulating film 13 is composed of a material having an optical refractive index that is similar to an optical refractive index of the first sensing patterns 12, and the second insulating film 16 is composed of a material having an optical refractive index that is smaller than the optical refractive index of the first insulating film 13.

For example, when the first sensing patterns 12 are composed of ITO, the first insulating film 13 may be composed of a material having an optical refractive index of between 1.7 and 1.8 (based on 550 nm wavelength). The second insulating film 16 may be composed of a material having an optical refractive index between the optical refractive index of air and the optical refractive index of the first insulating film 13, for example, an optical refractive index of between 1.5 and 1.65.

As described in the above embodiment, when the first and second insulating films 13 and 16 are formed in a multi-layer structure, the first insulating film 13 in the lower portion that is closer to the display panel is composed of a material having an optical refractive index between the optical refractive index of the transparent substrate 11 and the optical refractive index of the first sensing patterns 12, and the second insulating film 16 in the upper portion is composed of a material having an optical refractive index between the optical refractive index of air and the optical refractive index of the first insulating film 13.

Accordingly, the difference in light reflectance in the touch screen panel 10 that may occur as the first and second sensing patterns 12 and 14 are disposed on different layers can be improved as well as improving optical efficiency by reducing reflective light.

In addition, the first insulating film 13 is formed to have a suitably small heat deformation and a reduced surface roughness. Therefore the change in surface resistance of the first sensing patterns 12 is minimized or reduced, and the film formation of the second sensing patterns 14 is firmed.

By way of one example, in order to have the optical refractive index satisfying the conditions as described above, the first insulating film 13 may be composed of a transparent insulating material containing between 10 and 30 wt % of silicon dioxide (hereinafter, referred to as SiO2), between 5 and 30 wt % of zirconium oxide (hereinafter, referred to as ZrO2), and between 1 and 60 wt % of titanium dioxide (hereinafter, referred to as TiO2).

In one embodiment, the first insulating film 13 with a suitable optical refractive index may be implemented by utilizing a transparent insulating material having a composition including 30 wt % of SiO2, 10 wt % of ZrO2, and 60 wt % of TiO2.

Also, the second insulating film 16, which is an external layer compared to the first insulating film 13, may have its durability suitably reinforced against impact or scratch, etc. and have a surface roughness greater than the first insulating film 13. To this end, the composition of the second insulating film 16 may be suitably controlled by adding, for example, SiO2 granules, etc.

The second insulating film 16 as described above with a suitable optical refractive index may be implemented by utilizing a transparent insulating material having the composition including 20 wt % of SiO2, 10 wt % of ZrO2, 50 wt % of TiO2, and 20 wt % of SiO2 filler.

In other words, in the above described embodiments of the present invention, the optical efficiency is enhanced through the matching of the optical refractive index between the first insulating film 13 and the second insulating film 16, such that the difference in light reflectance of the entire touch screen panel 10 can be improved.

FIGS. 5A to 5E are cross-sectional schematic views sequentially showing a fabrication method of the touch screen panel of FIG. 4.

Figure 5A:
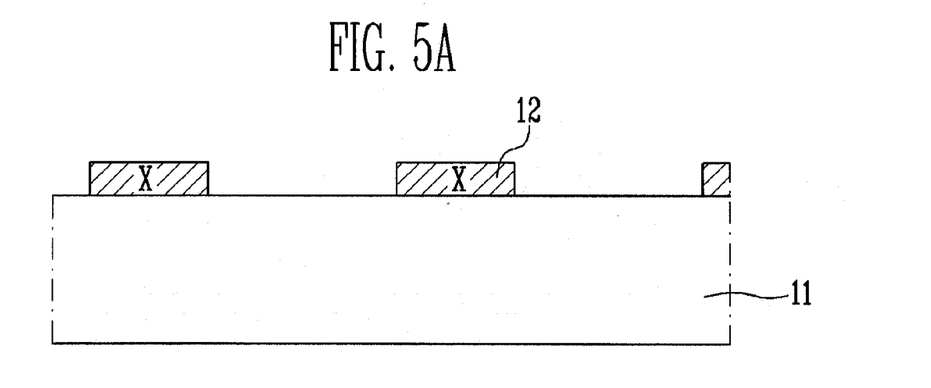
FIGS. 5A, 5B, 5C, 5D and 5E are cross-sectional schematic views sequentially showing a method of fabricating the touch screen panel of FIG. 4.

First, referring to FIG. 5A, a transparent electrode material such as ITO is deposited on an upper portion of a transparent substrate 11 and then is patterned, thereby forming first sensing patterns 12. Here, although coupling parts of the first sensing patterns 12 are not shown, the first sensing patterns 12 are patterned in order to be coupled to each other in a first direction (for example, in a column direction).

Figure 5B:
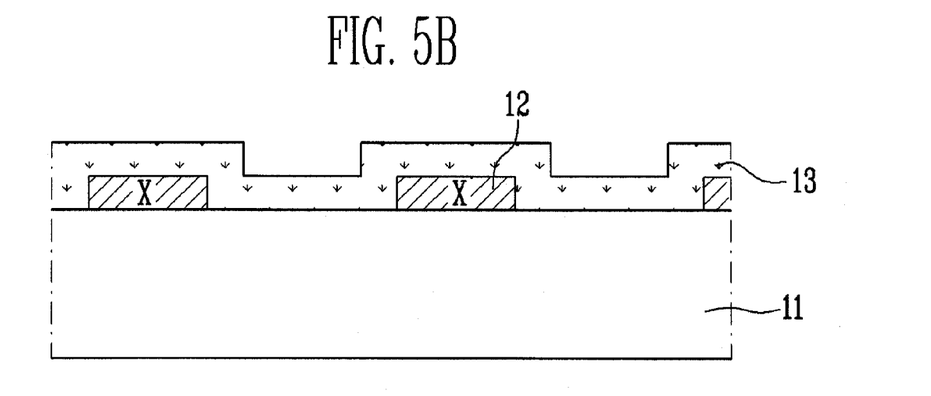

Thereafter, as shown in FIG. 5B, a first insulating material is printed and fired (or cured) on the first sensing patterns 12 by utilizing a suitable printing method that is relatively simple, thereby forming a first insulating film 13. In addition, the feature that the first insulating film 13 is formed by utilizing the printing method is merely one embodiment of the present invention, and the present invention is not limited thereto. For example, the first insulating film 13 may be formed by using a chemical vapor deposition (CVD) method and/or a sputtering method.

Figure 5C:
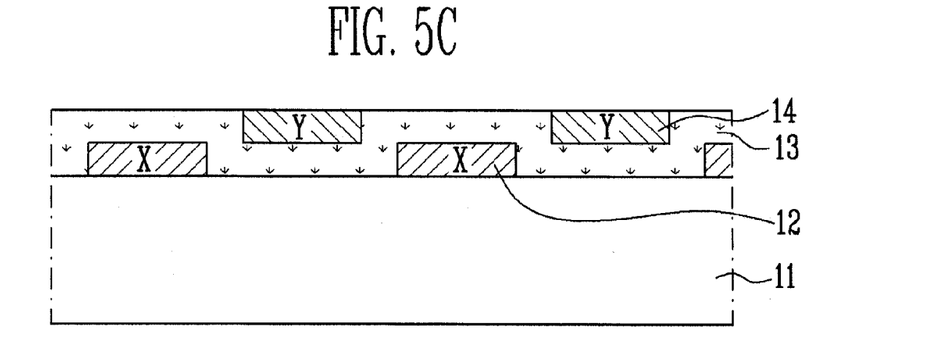

Thereafter, as shown in FIG. 5C, a transparent electrode material such as ITO is deposited on the first insulating film 13 and then is patterned, thereby forming the second sensing patterns 14. Here, the second sensing patterns 14 are disposed not to be overlapped with the first sensing patterns 12 (however, the coupling parts of the second sensing patterns 14 may be excluded). The second sensing patterns 14 are patterned in order to be coupled to each other in a second direction (for example, in a row direction).

In addition, after the second sensing patterns 14 are formed, the metal patterns 15 and position detecting lines, etc. shown in FIGS. 2 and 3 are further formed by utilizing a low resistance material having lower surface resistance than the transparent electrode material, such as a triple-layer of molybdenum/aluminum/molybdenum or a chrome film, etc.

Figure 5D:
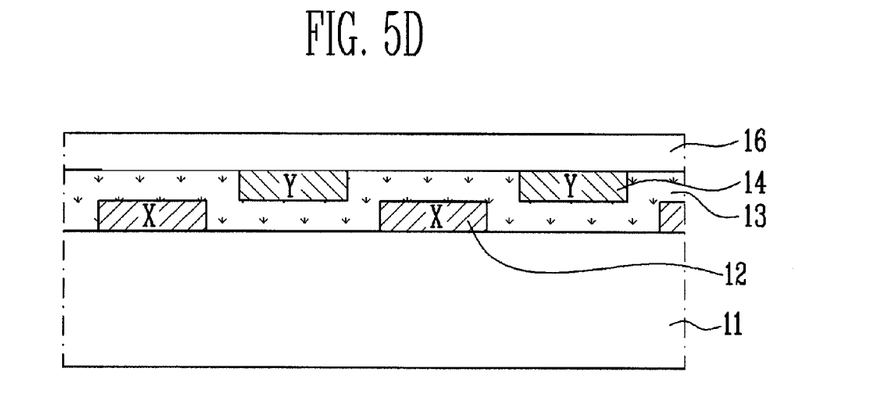

Thereafter, as shown in FIG. 5D, a second insulating material is printed and fired (or cured) on the second sensing patterns 14 and the metal patterns 15 in FIGS. 2 to 3 by utilizing a printing method, thereby forming a second insulating film 16. In addition, the method of forming the second insulating film 16 is not limited only to the printing method, but the second insulating film 16 may be formed by utilizing a CVD method and/or a sputtering method. In one embodiment, in order to reinforce the surface hardness of the second insulating film 16, the second insulating film 16 may be formed by utilizing the CVD method.

Figure 5E:
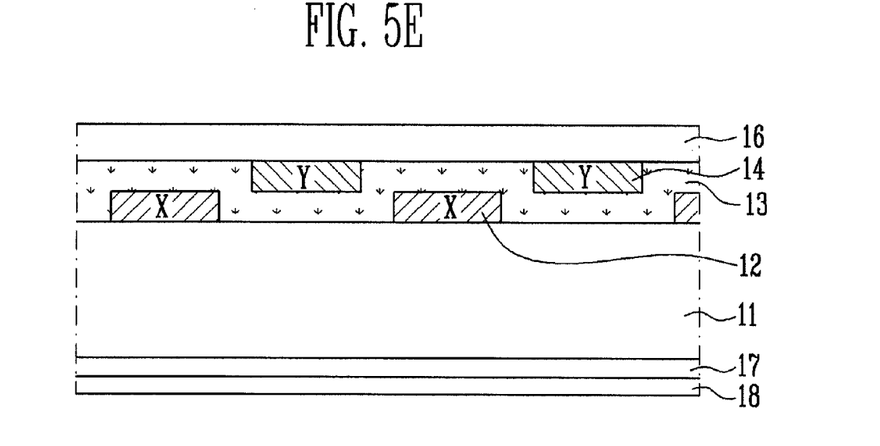

Thereafter, as shown in FIG. 5E, a transparent ground electrode 17 is deposited over the bottom surface of the transparent substrate 11 and furthermore, a third insulating film 18 is formed by utilizing the printing method, the CVD method and/or the sputtering method, etc., in order to cover the transparent ground electrode 17.

If the touch screen panel as described in the embodiments of the present invention is fabricated as described above, the mask process is minimized, and the process step is simplified, thereby making it possible to enhance process efficiency.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
   a transparent substrate;
   a plurality of first sensing patterns on the transparent substrate;
   a first insulating film on the first sensing patterns; and
   a second insulating film on the first insulating film,
   wherein the first insulating film and the second insulating film are composed of materials having different optical refractive indexes, and
   wherein the second insulating film is composed of a material having an optical refractive index greater than that of the first insulating film.

2. The touch screen panel as claimed in claim 1, wherein the first sensing patterns are composed of ITO, and the second insulating film is composed of a material having an optical refractive index between about 1.7 and about 1.8.

3. The touch screen panel as claimed in claim 1, wherein the first insulating film is composed of a material having an optical refractive index between the optical refractive index of air and the optical refractive index of the first insulating film.

4. The touch screen panel as claimed in claim 1, wherein the first sensing patterns are composed of ITO, and the second insulating film is composed of a transparent insulating material comprising between about 10 and about 30 wt % of $SiO_2$, between about 5 and about 30 wt % of $ZrO_2$, and between about 1 and about 60 wt % of $TiO_2$.

5. The touch screen panel as claimed in claim 4, wherein the transparent insulating material of the second insulating film is composed of about 30 wt % of $SiO_2$, about 10 wt % of $ZrO_2$, and about 60 wt % of $TiO_2$.

6. The touch screen panel as claimed in claim 5, wherein the first insulating film is composed of a transparent insulating material having a composition of about 20 wt % of $SiO_2$, about 10 wt % of $ZrO_2$, about 50 wt % of $TiO_2$, and about 20 wt % of $SiO_2$ filler.

7. The touch screen panel as claimed in claim 1, further comprising a plurality of second sensing patterns on the first insulating film.

8. The touch screen panel as claimed in claim 7, wherein the second sensing patterns are composed of a material having an optical refractive index between about 1.5 and about 1.65.

9. The touch screen panel as claimed in claim 1, wherein the first insulating film has a surface roughness greater than that of the second insulating film.

10. The touch screen panel as claimed in claim 1, wherein the second insulating film comprises at least one of $SiO_2$, $ZrO_2$, or $TiO_2$.

11. The touch screen panel as claimed in claim 1, wherein the first insulating film comprises at least one of $SiO_2$, $ZrO_2$, or $TiO_2$.

12. The touch screen panel as claimed in claim 1, wherein the first sensing patterns comprise a plurality of diamond shaped patterns connected by coupling members.

13. The touch screen panel as claimed in claim 7, wherein the second sensing patterns comprise a plurality of diamond shaped patterns connected by coupling members.

* * * * *